Dec. 31, 1929.  A. E. CRADY  1,741,616
CONVEYER
Filed May 4, 1927   4 Sheets-Sheet 1
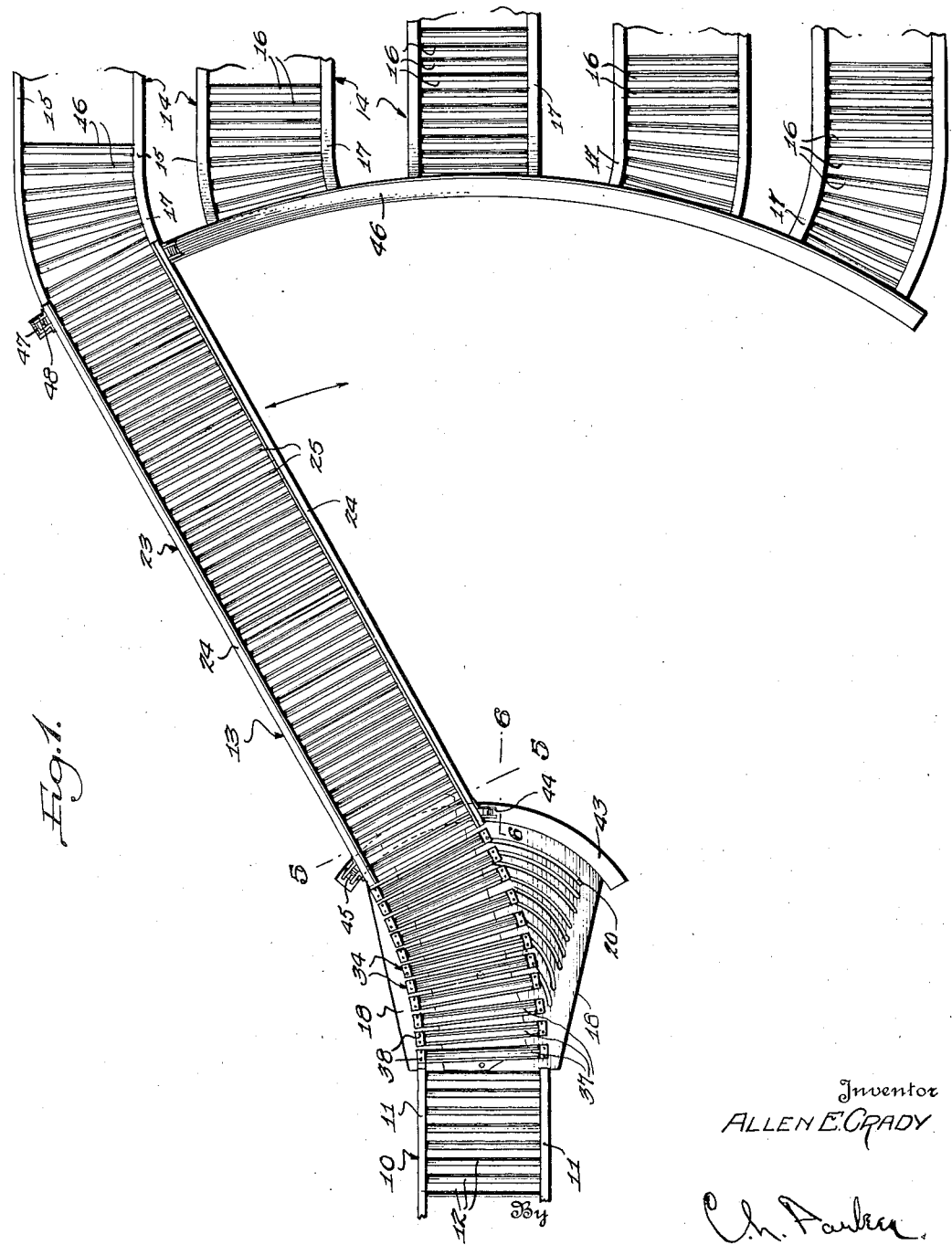
Inventor
ALLEN E. CRADY Dec. 31, 1929.  A. E. CRADY  1,741,616
CONVEYER
Filed May 4, 1927    4 Sheets-Sheet 2
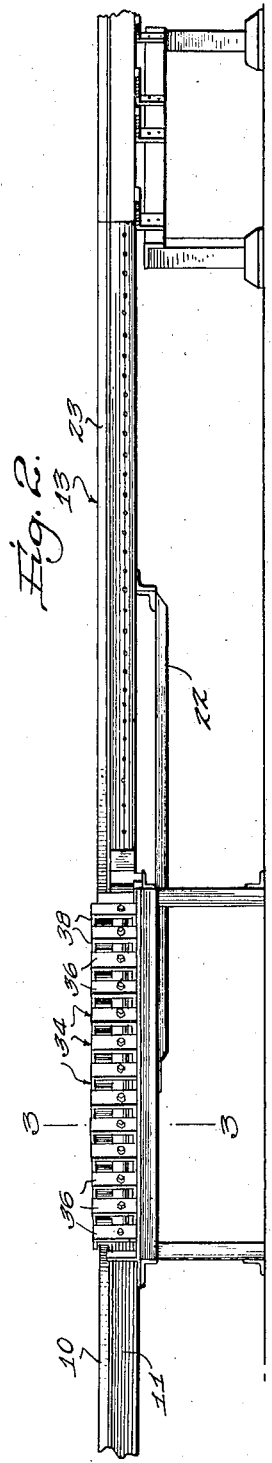
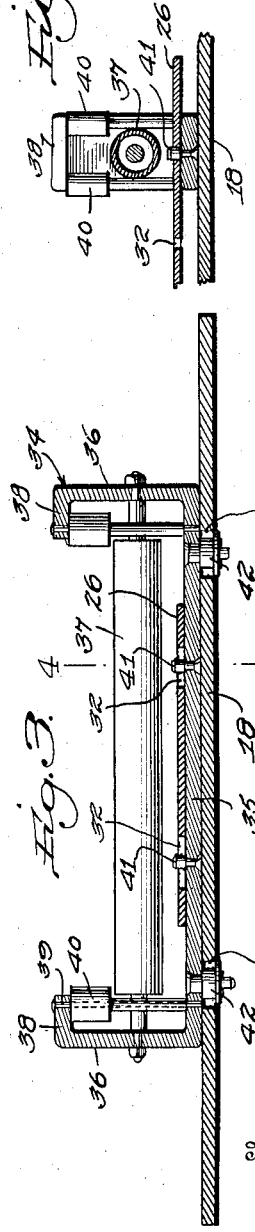
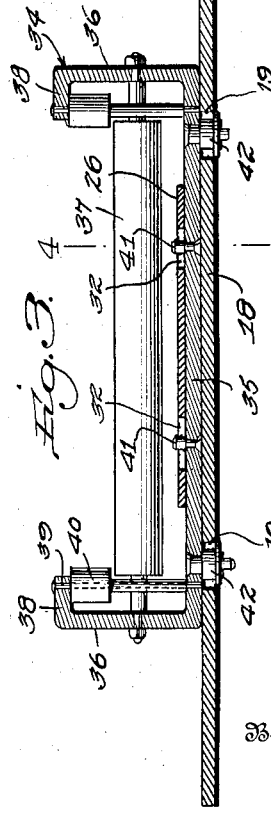
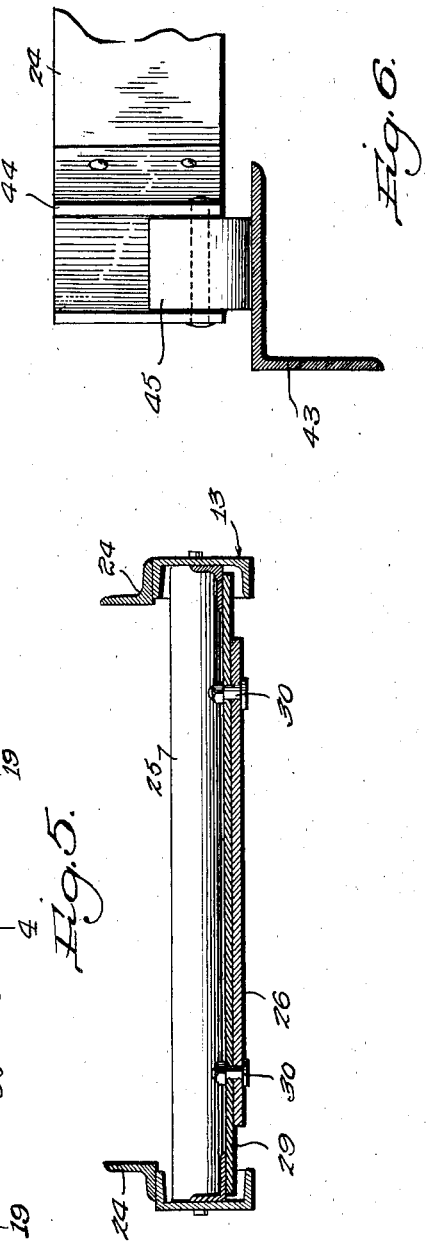
Inventor
ALLEN E. CRADY
By
Attorney

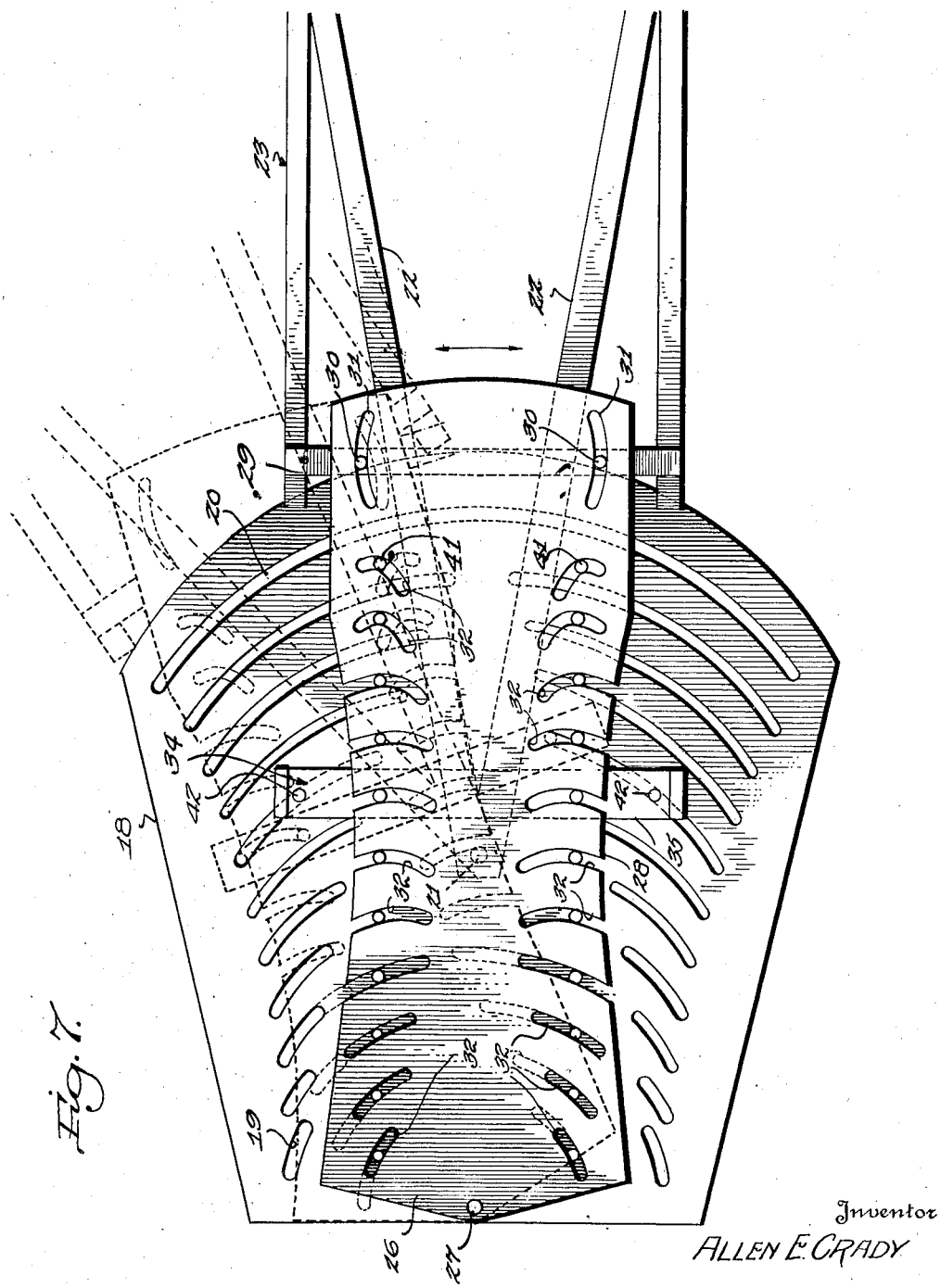

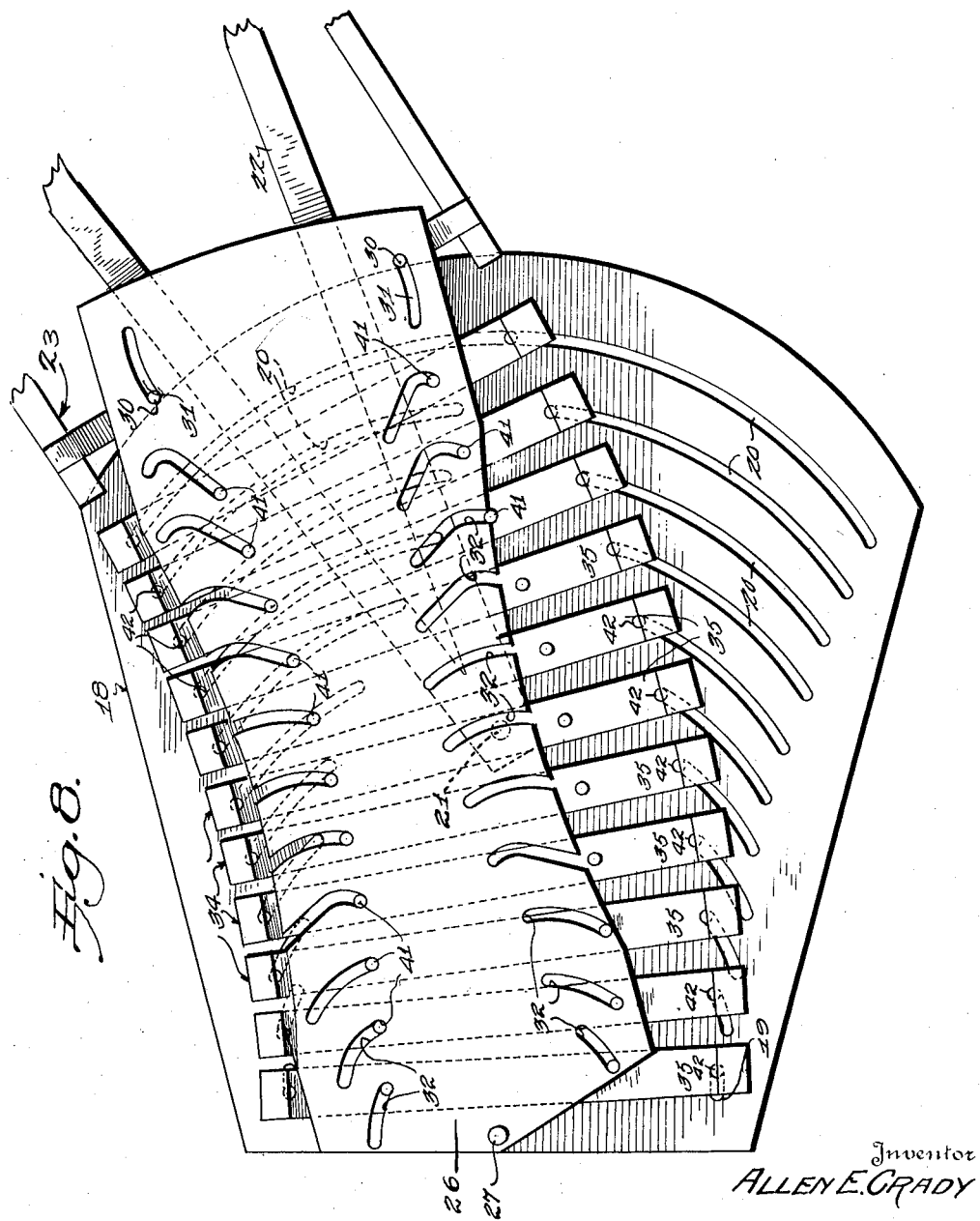

Patented Dec. 31, 1929

1,741,616

UNITED STATES PATENT OFFICE

ALLEN E. CRADY, OF LOUISVILLE, KENTUCKY, ASSIGNOR TO LOGAN CO., INC., OF LOUISVILLE, KENTUCKY, A CORPORATION

CONVEYER

Application filed May 4, 1927. Serial No. 188,781.

This invention relates to conveyers, and more particularly to a conveyer structure adapted to convey packages or the like between a fixed main section and a plurality of branch sections associated therewith. In the handling of packages and the like by means of conveyers, it is frequently desirable to provide a movable conveyer section by means of which the articles may be transferred from a main fixed conveyer to a plurality of branch conveyers, or to accumulate various packages from the branch conveyer upon the single main conveyer. In order to accomplish this result it obviously is necessary to provide a movable conveyer section which is relatively fixed at one end with respect to the main conveyer and the opposite end of which is adapted to be moved into registration with the branch conveyers. Considerable trouble has been experienced with devices of this character owing to the difficulties involved in providing an efficient connection between the main conveyer and the movable section to permit the articles freely to pass from one to the other. This is particularly true in connection with gravity and similar conveyers wherein the articles are supported while being conveyed upon successive rollers. In order to accomplish the result outlined above with a conveyer of the roller type, it is necessary that a number of the rollers be mounted adjacent the end of the main conveyer section in such a manner that they may alter their angular positions, and retain their equidistantly spaced relation, with respect to the movable conveyer section as the latter is moved into registration with any of the branch conveyers.

It is an important object of the present invention to provide a conveyer adapted to accomplish the results outlined above whereby efficient conveying means is provided for transferring articles between a main conveyer and a movable section.

A further object is to provide a device of the above mentioned character including a movable conveyer section as a whole the inner end of which includes a plurality of independently movable conveyer rollers which are adapted to alter their angular relation with respect to each other without disturbing the spaced relation therebetween.

A further object is to provide novel actuating means for the independently movable rollers adapted to be controlled by movement of the free end of the movable conveyer section.

A further object is to provide a device of the above mentioned character including a movable conveyer section made up of a tongue section and a plurality of independently movable rollers, the latter being adapted to alter their angular relationship whereby the section comprising such independently movable rollers is adapted to assume a curved shape forming a continuation of the main conveyer section and the tongue section.

A further object is to provide a conveyer of the type just mentioned wherein the independently movable rollers are mounted in supporting brackets, and to provide stationary means for guiding the brackets and movable means for actuating the brackets according to the angular position assumed by the tongue section of the conveyer.

A further object is to provide a device of the character set forth wherein each roller bracket is provided with pins or rollers adapted to slide in suitable slots formed in the stationary guide means, the brackets further being provided with pins or rollers adapted to engage within novel slots formed in the actuating means whereby the rollers are caused to move laterally and in a substantially circular path to permit the section of the conveyer comprising the rollers to assume a curved shape forming a continuation of the main conveyer and the tongue section to permit the efficient transfer of articles therebetween.

Other objects and advantages of the invention will become apparent during the course of the folowing description.

In the drawings I have shown one embodiment of the invention. In this showing,

Figure 1 is a plan view,

Figure 2 is a side elevation,

Figure 3 is a section taken substantially on line 3—3 of Figure 2,

Figure 4 is a detail section on line 4—4 of Figure 3,

Figure 5 is a similar view on line 5—5 of Figure 1,

Figure 6 is a similar view on line 6—6 of Figure 1,

Figure 7 is a plan view of the operating parts of the device and associated elements, and, Figure 8 is a similar view showing the parts in different relative positions.

Referring to Figure 1, the numeral 10 designates a main conveyer section comprising longitudinal side rails 11 between which is journalled a series of parallel conveyer rollers 12 of the usual construction. The device generally includes a movable section indicated as a whole by the numeral 13 and a plurality of branch sections 14. Each of the branch sections 14 also includes side rails 15 between which rollers 16 are mounted, and the central branch section 14 is straight and is arranged in alinement with the main section 10, as clearly shown. The side rails 15 of each of the outer branches 14 are curved as indicated at 17 whereby the inner ends of the branches are adapted to register with and form continuations of the outer end of the movable section 13. From the foregoing, it will be apparent that the device provides in general a main conveyer section, a plurality of branch sections, and a movable conveyer section the inner end of which is associated with the main conveyer and the outer end of which is adapted to be moved into registration with either of the branch sections to permit the transfer of articles in either direction between the main and branch conveyer sections. The device as a whole has been illustrated as being horizontally arranged, but it will be obvious that the apparatus is particularly adapted for use as a gravity conveyer in which case it will be inclined downwardly in either direction depending upon the desired direction of travel of the articles to be conveyed.

The device forming the subject matter of the present invention comprises means for altering the shape of the inner end of the swinging section as indicated in Figure 1 to efficiently transfer articles from the main conveyer 10 to the movable section 13. Referring to Figures 1, 7 and 8, the numeral 18 designates a guide plate the inner end of which is arranged adjacent the outer end of the main conveyer 10. The plate 18 is provided on opposite sides with a series of slots 19 which are substantially but not exactly arcuate in shape. At the outer end of the plate 18 a slot 20 is provided which preferably extends substantially throughout the width of the plate. The inner ends of the slots 19 are arranged at progressively decreasing distances apart toward the outer end of the plate 18 for a purpose which will become apparent. The plate 18 is provided substantially centrally thereof with a pivot pin 21 which carries the inner ends of a pair of tie rods 22 extending beneath the plate 18 and secured at their outer ends to a tongue section 23 forming the outer end of the movable conveyer section. The tongue section is similar in construction to the main and branch sections of the conveyer and comprises longitudinal side rails 24 having parallel equidistantly spaced rollers 25 arranged therebetween. It will be apparent that the tongue section is adapted to swing about the pivot point 21 to permit its outer end to register with the inner end of either of the branch sections.

An actuating plate 26 is pivotally connected at its inner end as at 27 to the inner end of the plate 18, this pivot point being arranged adjacent the outer end of the main conveyer 10. The actuating plate is spaced above the plate 18, and the edges of the plate 26 are concaved, as indicated at 28 for a purpose to be described. The inner end of the tongue section is provided with a transverse member 29 carrying a pair of upstanding pins 30, the latter being arranged in slots 31 formed in the outer end of the plate 26. Thus it will be apparent that as the tongue section swings about its pivot 21, the transverse movement of the member 29 will cause transverse movement of the plate 26, the latter swinging about its pivot 27. However, owing to the distance between the pivots 21 and 27, it will be apparent that the angular movement of the plate 26 will be materially less than that of the tongue section as the latter is swung to selective positions. The plate 26 is provided in opposite sides with slots 32 of novel form, the angles of the inner ends of the slots changing from one end of the plate 26 to the other end.

Referring to Figures 1, 3, 7 and 8, the numeral 34 designates a plurality of roller supporting brackets which are substantially U-shaped in cross-section, and the base portions 35 of these brackets are arranged between the plates 18 and 26. Each of the brackets is provided with arms 36 between which is journalled a conveyer roller 37 of the usual construction. The rollers 37 are adapted to assume angular positions with respect to each other as indicated in Figure 1, and it is preferred to provide means for lessening the friction of the passing articles and assisting them around the curve formed by the rollers 37. Accordingly the arms 36 are preferably provided at their upper ends with inwardly extending portions 38, and a pair of vertical shafts 39 are connected between each of these ends and the base of the bracket. A roller 40 is journalled on each shaft 39 adjacent its upper end (see Figure 4) and the articles passing over the rollers 37 contact with the rollers 40 thus facilitating their movement.

The base 35 of each bracket 34 is provided on opposite sides of the center thereof with an upstanding pin or small roller 41 which is adapted to engage within one of the slots 32 of the plate 26. Each face 35 is further provided adjacent opposite ends with depending rollers 42 each of which is adapted to engage within one of the slots 19.

Means are provided for supporting the tongue sections 23 for movement to selected positions. As shown, an arcuate rail 43 is formed concentric with the pivot pin 21 and is arranged adjacent the outer end of the plate 18. Brackets 44 are secured to opposite sides of the inner end of the tongue section 23, and rollers 45 are carried by these brackets and adapted to roll upon the rail 43. Thus it will be apparent that no weight is put upon the pin 21, this element merely acting as a pivot pin for the tongue section. A rail 46 is arranged adjacent the inner ends of the branch sections 14 and rollers 47 are adapted to roll upon this rail. These rollers are journalled in suitable brackets 48 carried by opposite sides of the outer end of the tongue section 23.

The operation of the apparatus is as follows:

When the end of the tongue section is in alinement with the central branch conveyer 14, the parts of the device will be arranged in what might be termed the normal position, in which position the several conveyer sections will be in alinement with each other and packages may be fed over the rollers in the usual manner, following a straight path through the conveyer sections. When the parts are in the normal position referred to, the stationary and actuating plates, and associated elements, will be arranged in the position illustrated in solid lines in Figure 7. With the parts in this position, pins 41 and 42 will be equidistantly spaced from the ends of the slots in the plates 18 and 26 respectively. When it is desired to distribute articles from the main conveyer 10 to either of the branches, or from one of the outer branches to the main conveyer, the free end of the tongue section 23 is manually swung to the desired position. It will be apparent that the tongue section is supported upon the rails 43 and 46 by the rollers 45 and 47 respectively, and the tongue section accordingly is adapted to be freely swung to the desired position. As previously stated, the angularity of the slots 32 varies from one end of the plate 26 toward the other end, and this angularity is utilized in effecting lateral movement of the brackets 34. It will be seen that if the slots 32 were similar in arrangement to, or formed, in effect, substantial continuations of the slots 19, lateral movement of the free end of the actuating plate 26 would not transmit any lateral movement to the brackets 34. It is obvious that the slots 32 adjacent the free end of the actuating plate are arranged at a material angle to the portions of the slots 19 in which the rollers 42 are normally arranged. When the tongue section is swung to one side, it pivots about the axis of the pin 21, and the arrangement of the pins 30 in the slots 31 causes the actuating plate 26 to swing about its pivot pin 27. Due to the angular arrangement of the slots referred to, the swinging movement of the actuating plate causes the outermost slot 32 to transmit movement to the outermost pin 41, and thus to the corresponding bracket 34. It will be obvious that the movement thus transmitted to the bracket causes the rollers or pins 42 to travel along the outermost slot 20 in the plate 18, and accordingly the corresponding bracket travels in an arcuate path. The next adjacent slots 32 are arranged at slightly different angles, and accordingly the movement imparted to the corresponding bracket 34 will be somewhat less than that imparted to the outermost bracket. It will be apparent that the lateral movement of the portions of the plate 26 adjacent the free end thereof will be materially greater than the corresponding movement adjacent the inner end due to the fact that the latter portions are nearer to the pivot pin 27. The slots 32 are so designed that their shape, and the lateral movement of the corresponding portion of the plate 26, will effect the desired lateral movement of the various brackets 34, it being apparent that the brackets toward the free end of the plate 26 should move to progressively increasing extents. As the swinging movement increases, the pins 41 gradually move toward the inner ends of their corresponding slots 32, and the pins are adapted to simultaneously reach the inner ends of their corresponding slots 32 while one set of pins 42 will simultaneously reach the outer ends of the slots 19 when the tongue section 23 reaches an extreme position in alinement with the inner end of one of the outermost branch sections. It will be obvious that when the pins reach the ends of the slots in the manner described, they act to limit the movement of the tongue section to the desired outermost position. In Figure 8 of the drawings the parts have been illustrated in this extreme poistion, and thus it will be apparent that the pins are adapted not only to guide the various brackets 34 but also to limit their movement, and through the plate 26, the movement of the tongue section 23. With the apparatus described, the rollers 37 are adapted to assume positions equidistantly spaced from each other regardless of the angular position of the tongue section of the conveyer. When the tongue section is arranged in any position other than the normal position referred to, the axes of the rollers 37 are all radially arranged with respect to a common center. Thus it will be apparent that packages or other articles may pass freely between the stationary section 10 and the tongue section 23, the movement being facilitated by the even curvature and arrangement of the rollers 37. The curvature of the ends of the branch sections also will facilitate the passage of packages between the tongue section 23 and the branch sections, and it is desired that the curved sections referred to be provided with rollers similar in construction to the rollers 40 to facilitate the movement of the packages. It will be apparent that the articles passing through the conveyer may contact with the rollers 40 whereby the latter facilitate the turning movement imparted to the packages. These rollers, however, may be eliminated if desired, and the packages permitted to slide over the sides of the brackets 34 and the rails 15. The edge portions of the plate 26 are concaved as at 28 merely to provide clearance between these edge portions and the arms 36 of the brackets.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A conveyer comprising a main section, a straight movable section, a connecting conveyer section between said main and movable sections and including a plurality of independently movable equidistantly spaced parts, and an actuating plate controlled by movement of said movable section to alter the positions of the parts of said connecting section whereby the latter is adapted to assume a curved shape forming a continuation of the adjacent portions of said movable and main sections.

2. A conveyer comprising a main section, a straight movable section, a connecting conveyer section between said main and movable sections and including a plurality of normally parallel rollers, and an actuating plate controlled by movement of said movable section to alter the positions of said rollers whereby said connecting section is adapted to assume a curved shape forming a continuation of the adjacent portions of said main and movable sections.

3. A conveyer comprising a main section and a movable section each provided with rollers, a connecting conveyer section comprising a plurality of brackets each provided with a roller, said last named rollers being normally equidistantly spaced, and an actuating plate controlled by movement of said movable section to alter the positions of said brackets whereby said connecting section is adapted to assume a curved shape forming a continuation of the adjacent portions of said main and movable sections with the rollers of said connecting section equidistantly spaced and arranged at equal angles with respect to each other.

4. A conveyer comprising a main section and a movable section each provided with rollers, a connecting conveyer section comprising a plurality of brackets each provided with a roller, said last named rollers being normally equidistantly spaced, an actuating plate movable by said movable section, and means connecting said brackets to said actuating plate to alter the positions of said brackets whereby said connecting section is adapted to assume a curved shape forming a continuation of the adjacent portions of said main and movable sections with the rollers of said connecting section equidistantly spaced and arranged at equal angles with respect to each other.

5. A device constructed in accordance with claim 4 wherein the means connecting said brackets to said actuating plate includes a pair of pins carried by each of said brackets, said actuating plate being provided with slots receiving said pins.

6. A device constructed in accordance with claim 4 provided with means for guiding said brackets in arcuate paths upon movement of said movable section.

7. A conveyer comprising a main section and a movable section each provided with parallel rollers, a connecting conveyer section comprising a plurality of brackets each provided with a roller, said last named rollers being normally equidistantly spaced, a guide plate provided with a plurality of slots, each of said brackets being provided with a pair of pins slidable in said slots, an actuating plate pivotally connected adjacent the end of said main section and adapted to be moved upon movement of said movable section, said actuating plate being provided with slots, and pins carried by said brackets and adapted to engage within said last named slots.

8. A conveyer comprising a main section and a movable section each provided with rollers, a connecting conveyer section comprising a plurality of substantially U-shaped brackets each provided with a roller mounted between the arms thereof, said last named rollers being normally equidistantly spaced, a stationary guide plate arranged beneath said brackets and acting as a support therefor, said rollers being movable and being adapted to be guided by said plate to cause them to travel in arcuate paths, and means controlled by movement of said movable section for moving said brackets whereby said connecting section is adapted to assume a curved shape forming a continuation of the adjacent portions of said main and movable sections with the rollers of said connecting section equidistantly spaced and arranged at equal angles with respect to each other.

9. A conveyer comprising a main section and a movable section each provided with rollers, a connecting conveyer section comprising a plurality of substantially U-shaped brackets each provided with a roller mounted between the arms thereof, said last named rollers being normally equidistantly spaced, a stationary guide plate arranged beneath and supporting said brackets, said brackets being movable and being adapted to be guided by said plate to cause them to travel in arcuate paths, and an actuating plate controlled by movement of said movable section for moving said bracket whereby said connecting section is adapted to assume a curved shape forming a continuation of the adjacent portions of said main and movable sections with the rollers of said connecting section equidistantly spaced and arranged at equal angles with respect to each other.

10. A conveyer comprising a main section and a movable section each provided with rollers, a connecting conveyer section comprising a plurality of substantially U-shaped brackets each provided with a roller mounted between the arms thereof, said last named rollers being normally equidistantly spaced, a stationary guide plate arranged beneath and supporting said brackets, said guide plate being provided with slots, pins carried by said brackets and slidable in said slots whereby the latter are adapted to be guided by said slots to cause them to travel in arcuate paths, and an actuating plate controlled by movement of said movable section for moving said bracket whereby said connecting section is adapted to assume a curved shape forming a continuation of the adjacent portions of said main and movable sections with the rollers of said connecting section equidistantly spaced and arranged at equal angles with respect to each other.

11. A device constructed in accordance with claim 10 wherein said actuating plate is arranged over said brackets and beneath the rollers thereof and is provided with slots arranged at different angles to the corresponding slots of said guide plate, said brackets being provided with upstanding pins slidable in the slots of said actuating plate whereby the latter is adapted to effect movement of said brackets upon movement of said movable section.

12. A device constructed in accordance with claim 10 wherein said actuating plate is pivotally connected to said guide plate at a point adjacent the end of said main section, said actuating plate being pivotally connected to said guide plate intermediate the ends of the latter and provided with slots, said brackets being provided with pins slidable in the slots of said actuating plate, the free end of said actuating plate being connected to said movable section at a point spaced from the pivot thereof whereby said actuating plate is adapted to be swung about its pivot upon movement of said movable section, the slots of said movable section engaging said last named pins to effect movement of said brackets.

In testimony whereof I affix my signature.

ALLEN E. CRADY.